United States Patent

[11] 3,593,050

| [72] | Inventor | James Kittrell Ware<br>Columbus, Miss. |
|---|---|---|
| [21] | Appl. No. | 812,257 |
| [22] | Filed | Apr. 1, 1969 |
| [45] | Patented | July 13, 1971 |
| [73] | Assignee | AMBAC Industries, Incorporated<br>Columbus, Miss. |

[54] TROLLING MOTOR
6 Claims, 8 Drawing Figs.

[52] U.S. Cl. .................................................. 310/87,
310/14, 115/18
[51] Int. Cl. ...................................................... H02k 5/12
[50] Field of Search............................................ 310/66, 67,
68, 72, 87, 154, 758, 86, 64; 115/18, 18 E, 38

[56] References Cited
UNITED STATES PATENTS

| 2,634,375 | 4/1953 | Guimbal | 310/87 X |
| 1,764,388 | 6/1930 | Buchet | 115/18 E |
| 1,879,675 | 9/1932 | Fitzgerald | 310/72 X |
| 2,116,146 | 5/1938 | Gondek | 115/135 |
| 2,429,774 | 10/1947 | Schultz et al. | 115/18 EX |
| 2,824,984 | 2/1958 | Harris | 310/87 |
| 3,090,877 | 5/1963 | Baumhart | 310/154 |

*Primary Examiner*—D. F. Duggan
*Attorney*—Howson & Howson

ABSTRACT: A trolling motor for operation immersed in water is provided including a watertight motor housing, permanent magnet flux generating means supported by the motor housing and an armature assembly having a shaft rotatably supported by the motor housing, the trolling motor being arranged such that heat generated by operation of the motor is conducted through the motor housing directly to the water.

INVENTOR.
JAMES K. WARE
BY Howson & Howson
ATTYS.

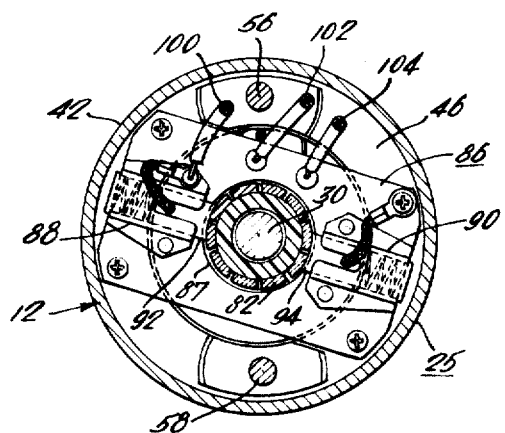
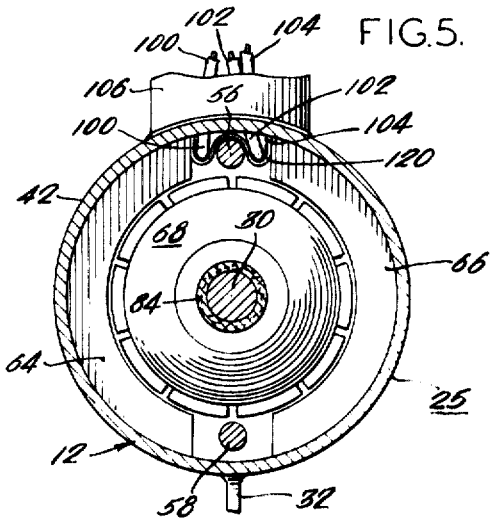
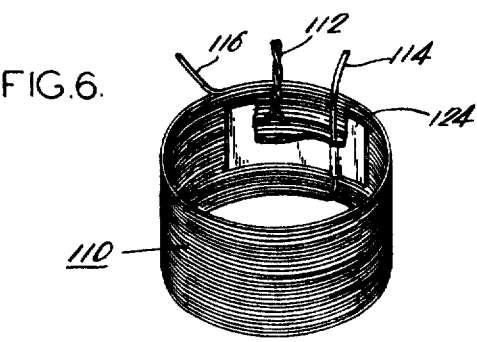
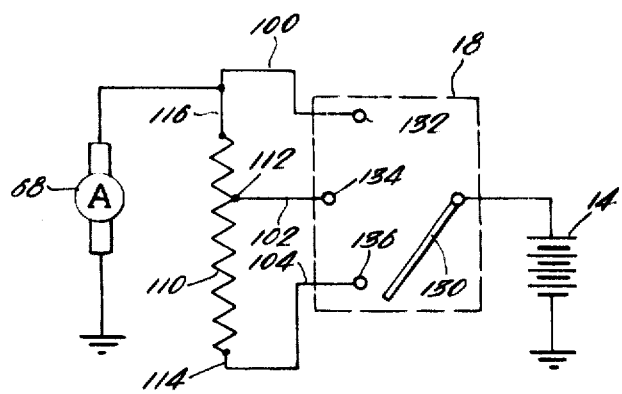
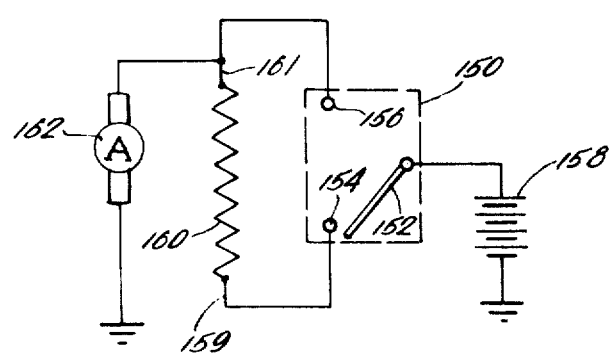

TROLLING MOTOR

The present invention relates to an electric trolling motor adapted for operation immersed in water, and, more specifically, to an improved motor housing for the trolling motor arranged to have heat generated by operation of the motor conducted through the motor housing directly to the water.

In the prior art, small electric trolling motors have been employed to power small boats, such as small fishing and row boats, at a slow rate of speed, for example, speeds of 1 to 2½ miles per hour. Such trolling motors are adapted to be portable and are coupled to the boat with which they are used by any suitable means which permits the motor to power the boat. These trolling motors with their associated propellers are adapted to be immersed in water during use in powering the boat. In most prior art trolling motors, a motor and its housing are disposed in a separate housing to provide a watertight arrangement. In trolling motors having a variable speed capability, resistors are employed for speed control purposes and have been made large to dissipate the heat generated thereby. These resistors have been located above the water and require a large area to dissipate the heat into the air or surrounding media in an attempt to prevent destruction to the parts. Also, the resistors in such arrangements must be made of material capable of withstanding extremely hot temperatures, which are in excess of several hundreds of degrees.

Difficulties have been experienced with the prior art trolling motors in regard to heat dissipation, which is a major problem with such motors operating in sealed housings. Motor housings which are contained in a separate housing have been found to become extremely hot during operation and the heat may cause destruction of parts of the system. Also, in prior art trolling motors employing large resistors, the heat generated thereby may be sufficient to self-destruct the insulation or the resistor assembly. Also, where the resistors have been made large enough to try to conduct the heat to the air or surrounding media, the material of the resistor must be made capable of withstanding extremely hot temperatures and the resistors and their structures have been more expensive and larger than desired. Thus, it is desirable to provide a trolling motor which provides good heat transfer characteristics for the motor and any resistor employed in a circuit therewith and one which permits an inexpensive resistor to be employed in a circuit to provide variable speed operation of the motor. It is also desirable to provide a trolling motor which is inexpensive to manufacture and assemble and one which has a small housing but yet provides some means for effectively dissipating heat generated by a resistor employed in a circuit therewith.

In accordance with the present invention, an improved electric trolling motor is provided which is adapted for operation immersed in water. The trolling motor comprises a watertight motor housing including a hollow housing portion with an open end and an end cap adapted to close and seal the open end of the hollow housing portion. Permanent magnet flux generating means is supported by the motor housing and an armature assembly is provided having a shaft rotatably supported by the motor housing. There is employed electrical means for connecting the armature assembly to a source of voltage. In this arrangement, the motor housing is adapted to be immersed in water and heat generated by operation of the motor is conducted through the motor housing directly to the water. Preferably, the source of voltage is provided by a conventional battery, which is positioned in the boat, and watertight conduit means is provided for conducting the electrical means from the battery to the motor housing through the water and providing a seal between the motor housing and the conduit means.

In the preferred form of the invention, the electrical means includes electrical resistance means positioned in the motor housing and circuit means for connecting the source of voltage alternatively directly to the armature or to the armature through the electrical resistance means, whereby when the resistance means is connected in a circuit, heat generated by the resistance means is dissipated through the motor directly to the water. Preferably, the electrical resistance means comprises a coil of wire wound in a tubular form and supported adjacent the walls of the motor housing to provide good heat transfer from the resistor through the motor housing to the water for cooling the system. Furthermore, the coil of wire preferably has a connection terminal between its end and the circuit means connects the source of voltage alternatively directly to the armature, to the armature through the coil of wire, or to the armature through a portion of the coil of wire from the connection terminal so that three selectable speeds of motor operation are provided.

The present trolling motor with the electrical resistance means supported in the motor housing adjacent the walls thereof enables the use of less expensive material to form the electrical resistance means and enables the resistance means to be smaller in size for a given power rating than those employed in the prior art. Also, in this arrangement a single motor housing is employed with the resistor as an integral part, which permits a more compact and more inexpensive assembly. The resistance means in the present instance is placed in close proximity to the walls of the motor housing, which are immersed in water and provide high thermal conductivity for conducting heat from the resistance means to the water. Thus, the trolling motor of the present invention facilitates a compact assembly while providing a good heat dissipation arrangement for conducting heat from the resistance means.

For a better understanding of these and other features and advantages of the present invention, reference is made to the following description and accompanying drawings, in which:

FIG. 4 is a sectional view taken along line 4—4 of FIG. 2;

FIG. 5 is a sectional view taken along line 5—5 of FIG. 2;

FIG. 6 is a perspective view of the coil of wire providing the electrical resistance means for the trolling motor shown in FIG. 2;

FIG. 7 is a schematic circuit diagram showing a preferred circuit of the trolling motor of the present invention; and FIG. 8 is a schematic circuit diagram showing another circuit for the trolling motor.

Figure 1:
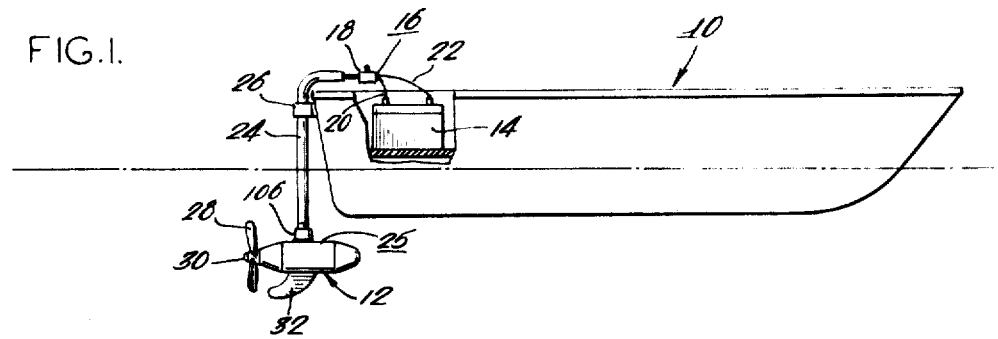
FIG. 1 is a schematic side elevational view of a boat, with parts broken away, provided with a trolling motor in accordance with the present invention.

Referring to the drawings, there is represented in FIG. 1 a boat, generally designated 10, such as a conventional row boat, having a trolling motor, generally designated 12, associated therewith for propelling the boat through the water. There is also illustrated in FIG. 1 a storage battery 14 positioned in the boat and providing a source of direct current voltage for the electric trolling motor 12. Power is supplied to the trolling motor by electrical means generally designated 16, which includes a control switch 18 connected in a circuit with battery 14 by suitable electrical lines 20 and 22. Electrical lines from control switch 18 to the trolling motor pass through watertight conduit means 24, which is provided by an L-shaped pipe extending from above the boat to trolling motor housing generally designated 25 for being coupled to the motor housing in a watertight seal. The trolling motor is supported by conduit or pipe 24, which is held to the boat by bracket 26 at the back of the boat. Of course, the trolling motor could be supported by the conduit or pipe 24 from the side or front of the boat as desired and any suitable means for holding the conduit or pipe to the boat may be employed. The trolling motor 12 is provided with a propeller, generally designated 28, fixed to armature shaft 30 of the motor for propelling the motor and boat through the water. A fin or rutter 32 is fixed to a bottom surface of the motor housing, as by welding, to control the direction of movement of the boat and provide a means for protecting the propeller from objects in the water and from scraping ground. The direction of travel of the boat is controlled by rotating conduit or pipe 24 with respect to its generally vertical axis.

Figure 2:
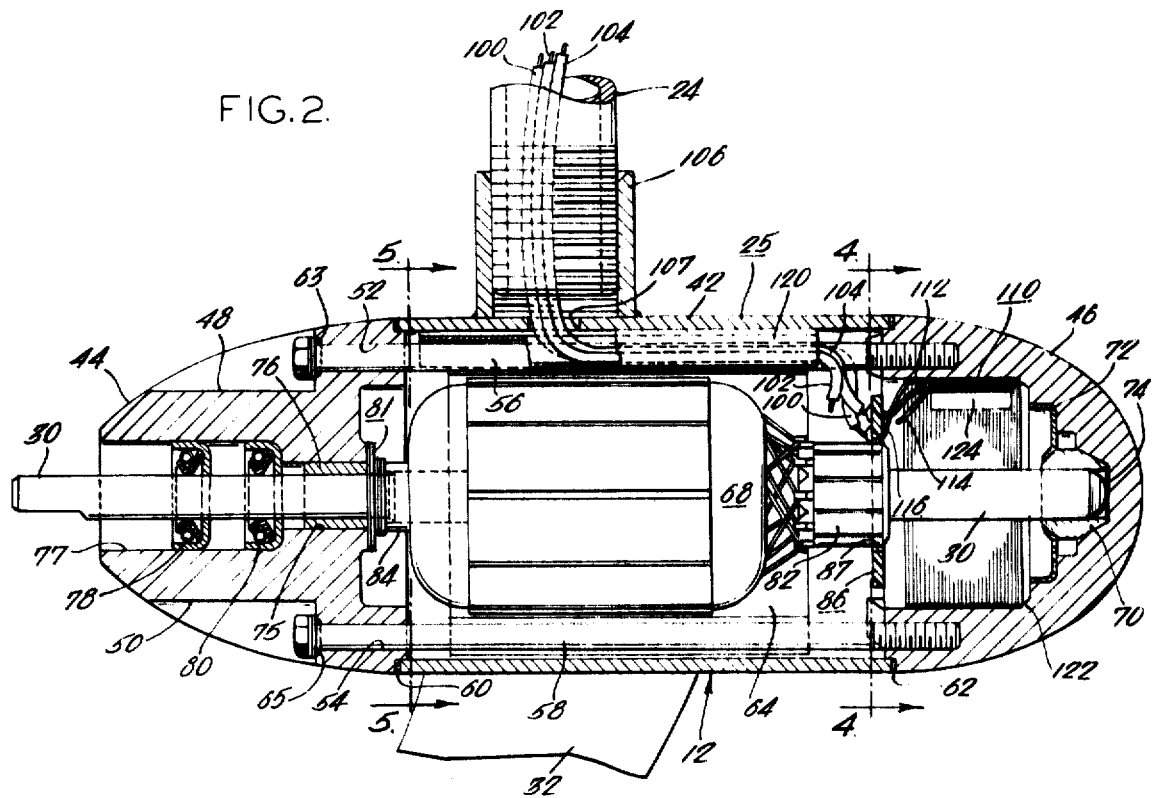
FIG. 2 is a sectional view of the trolling motor with the propeller omitted similarly viewed as in FIG. 1.
Figure 3:
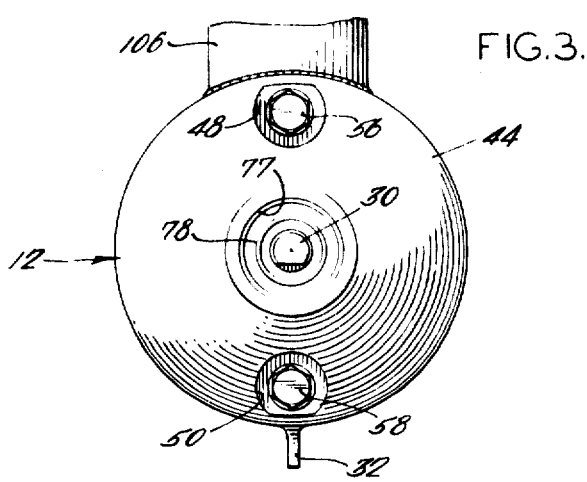
FIG. 3 is an end elevational view of the trolling motor of FIG. 2.

Referring to FIGS. 2 and 3, the trolling motor comprises a watertight housing 25 which includes a central tubular portion or section 42 having open ends and a pair of end caps 44 and 46 cooperating with the open ends of the tubular portion for closing the ends. The end caps 44 and 46 are generally outwardly curved in an arcuate form to reduce turbulence of water as the trolling motor proceeds through the water.

As shown in FIGS. 2 and 3, end plate 44 has two diametrically opposed recesses 48 and 50 with openings 52 and 54, respectively, extending therefrom through the end cap for receiving through bolts 56 and 58, respectively, which extend through tubular portion 42 of the housing and are threaded into end cap 46. The through bolts 56 and 58 serve to hold the end caps 44 and 46 against the central tubular portion 42 and annular sealing rings 60 and 62 are held between the end caps 44 and 46, respectively, and the central tubular portion 42 of the housing for providing a watertight seal therebetween. Sealing rings 63 and 65 are positioned between the through bolts 56 and 58, respectively, and end cap 44.

The electric motor further includes permanent magnet flux generating means comprising two permanent magnets 64 and 66 which are arcuate in form and are symmetrically spaced around the walls of the tubular portion of the housing and conform to the shape of the walls of the tubular portion, as shown in FIGS. 2 and 5. The permanent magnets are positioned against the sides of the tubular portion on opposite sides of through bolts 56 and 58, as shown in FIG. 5. The tubular portion of the motor housing provides a flux return path for the magnets, which are face polarized providing poles of opposite polarity around the tubular portion. Also contained within motor housing 40 is an armature assembly, generally designated 68, which is journaled in the end caps 44 and 46. More specifically, the shaft 30 of armature 68 is received in bearing 70 which is held within end cap 46 by annular retaining member 72 press fitted within a recess in the end cap. The end of shaft 30 within end cap 46 abuts against thrust washer 74. The other end of shaft 30 extends through central opening 75 in end cap 44 and is adapted to have propeller 28 pin thereto. The shaft 30 extends through end cap 44 within an annular bearing 76 press fitted within opening 75 in the end cap. The opening 75 through end cap 44 has an increased diameter portion 77 and a pair of annular sealing members 78 and 80 are inserted within the increased diameter portion between the end cap and shaft 30 to provide a watertight seal therebetween. A series of washers, generally designated 81, surround the shaft between a spacer 84 on shaft 30 and end cap 44, as shown in FIGS. 2. The armature assembly 68 is of a conventional type comprising a stack plurality of thin laminations of magnetic material with windings wound thereon, the windings being coupled to commutator means or segments, generally designated 82, supported on the armature shaft.

As shown in FIGS. 2 and 4, an insulating board, generally designated 86, is fixed to end cap 46 as by screws and is positioned at the opening into the end cap to lie within the opening of central tubular portion 42 of the motor housing. The insulating board is supported by the end cap and has a central opening 87 large enough to accommodate armature shaft 30 and the commutator means 82. The insulating board 86 supports brush holders 88 and 90, which support spring biased brushes 92 and 94, respectively, adapted to contact and ride over the appropriate commutator segments of commutator means 82. The brushes may be formed of a conventional material, such as carbon or a sintered copper-lead-graphite mixture.

Electrical current is conducted from the control switch 18 to the armature by electrical means shown in FIGS. 2 and 4. More specifically, the electrical means comprises electrical lines 100, 102 and 104 which are located in and conducted through the water in watertight conduit means 24. The electrical lines pass into the motor housing through an opening 107 in a sidewall of tubular portion 42. There is mounted on the tubular portion around the opening a fitting 106, which may be welded to the tubular housing portion, and the fitting is internally threaded to receive the externally threaded end of conduit 24 to hold the conduit and motor housing together and providing a watertight seal between the motor housing and conduit. One of the lines 100 is connected directly to brush 92, as shown in FIG. 4, brush 94 being connected to electrical ground. The other of the electrical lines 102 and 104 are connected to electrical resistance means generally designated 110, shown in FIGS. 2 and 6, to provide variable speed operation of the motor. The electrical resistance means in the present instance is provided by an electrical conductor comprising a coil of wire having an insulating film on the wire. The wire may be copper bonded wire and after the wire is wound in the generally cylindrical form shown, the wire preferably has a bonding agent or any suitable means coated thereon for holding the turns together.

In order to provide three speeds of operation, the coil or resistance means is provided with a connection terminal 112 between its end terminals 114 and 116 in order to have the source of voltage connected with no resistance in the circuit for the motor, with the resistance of the full coil in the circuit, or the resistance of a portion of the coil between connection terminal 112 and end terminal 116 in the circuit. The connection terminal is preferably provided by taking a turn out of the coil and having it extend outwardly to provide a terminal for connection in the circuit of the motor. More specifically, electrical line 104 is connected with end terminal 114 of the coil and electrical line 102 is connected to connection terminal 112. End terminal 116 of the coil is connected to brush 94 by suitable electrical connections. The electrical lines 100, 102 and 104 which pass through conduit means 24 into the tubular portion of the motor housing are held out of the way of the armature in the tubular portion by an insulating member 120, which may be provided by stiff paper, as shown in FIGS. 2 and 5, folded around through bolt 56 between magnets 64 and 66, the insulating paper providing two passages for the lines, line 100 being in one passage and lines 102 and 104 being in the other passage.

The coil of wire providing the electrical resistance means is in the present instance shown positioned within a cylindrical recess 122 in end cap 46 and the coil surrounds the armature shaft 30 and is positioned adjacent the sidewalls of the end cap. The coil is preferably fixed to the end cap, as by a suitable bonding agent, and is located adjacent the sidewalls of the end cap to be in good heat transfer relationship with the end cap for having heat generated by the resistance dissipated through the end cap to the water, thereby providing a good heat sink for heat generated by the resistance. The wires providing the terminals for the coil may be held out of the way of the armature assembly by any suitable means, such as tape generally designated 124 in FIGS. 2 and 6.

It should be appreciated that the positioning of the resistance means or coil within the motor housing provides a good means for transfer of heat from the resistance to the water, thereby enabling the use of low cost wire to provide a resistor. The coil of wire may provide one-half ohm of resistance from terminal connection 112 to the end terminal 116 and 1½ ohms resistance between end terminals 114 and 116 and 40 to 50 watts of power may be dissipated in the resistance wire. It should be apparent that the resistance coil of wire could be positioned in other portions of the motor housing, such as tubular portion 42 of the housing. Furthermore, the resistance wire could be positioned in the conduit of pipe 24 which lies beneath the water and the heat from the wire would be conducted through the pipe to the surrounding water. Also, the resistance wire may be wound or formed in any convenient shape as long as the desired amount of resistance is provided by an appropriate length of wire or other means could be employed to provide the desired resistance.

The motor shown and described in FIG. 2 operates in a conventional manner with direct current being supplied from the source of voltage 14 to the armature through the electrical lines and depending on the amount of resistance in the electrical circuit from the source of voltage to the armature, the motor may operate at one of three speeds. The preferred circuit for the system is schematically shown in FIG. 7 wherein parts of the trolling motor and electrical means of FIGS. 1—6 which appear in FIG. 7 are identified by the same number designators. In this circuit, the manual control switch 18 has a single-pole 130, which is selectively connectable alternatively with each of contacts 132, 134 and 136, respectively, for operating the motor at one of three speeds. The pole 130 of control switch 18 is electrically connected to the positive terminal of the source of voltage 14, shown as a battery, which has its negative terminal connected to electrical ground.

Contact 132 of the control switch is directly connected to armature 68 of the trolling motor by electrical line 100. Contact 134 is connected by electrical line 102 to terminal connection 112 of the resistance means or element 110 and through a portion of the resistance element from connection terminal 112 to end terminal 116, which is connected to the armature. Contact 136 is connected by electrical line 104 to end terminal end 114 and through the entire resistance element 110 to armature 68. The circuit arrangement is such that when pole 130 of manual control switch 18 is moved to contact the contact 136, the current from the battery will pass through the resistance element to the armature of the motor and the motor operates at its first or slow speed. When pole 130 is rotated to contact the contact 134, current passes from the battery through a portion of the resistance element from terminal connection 112 to end terminal 116 and to the armature, so that the motor is energized in a circuit with a small amount of resistance, and the motor operates at a second or intermediate speed. When pole 130 is rotated to contact the contact 132, the source of voltage 14 is connected directly to the armature by line 100 so that current passes directly to the armature from the battery and the motor operates at its third or high speed. With a standard trolling motor in accordance with the invention employed on a twelve-foot aluminum fishing pram, at high-speed operation of the motor, the pram may be driven at, for example, 2¾ miles per hour through the water.

It should be obvious that the circuit for the trolling motor can be modified in various respects in accordance with the present invention. FIG. 8 is a schematic illustration showing an alternative form for the circuit used with the trolling motor. In the circuit of FIG. 8, a manual control switch 150 is shown having a pole 152 selectively connectable alternatively to terminals 154 and 156. The pole of control switch 150 is connected to the positive terminal of battery 158, which has its negative terminal connected to electrical ground. In this arrangement, the resistance element has been modified so that the circuit provides only two speeds of operation of the trolling motor. More specifically, contact 154 is connected to terminal end 159 of resistance element 160, which has its other terminal end 161 connected to armature 162 of the trolling motor. Contact 156 is connected directly to the armature 162. When pole 152 of the control switch 150 contacts the contact 154, the battery will be connected through resistance element 160 to the armature, providing a first or slow speed of operation of the motor. When the pole 152 is connected to contact the contact 156, the battery is connected directly to the armature so that current flows directly from the battery to the armature, and a second or high speed of operation for the trolling motor is provided.

It should be appreciated that more or fewer speeds of operation of the trolling motor can be provided in accordance with the present invention. The control switch can be adapted to have a single contact wherein a resistance element may be connected in the circuit of the armature at all times or the resistance element may be omitted. Furthermore, the resistance element may have more than one terminal connection or be divided into a number of parts to provide a number of speeds of operation of the motor, if desired.

It will be observed by those skilled in the art that the trolling motor housing employed in the present invention provides a simple and inexpensive motor assembly while enabling the dissipation of heat generated by operation of the motor directly to the water. Furthermore, by employing such a housing, an inexpensive resistance means may be employed in the housing and heat generated by the resistance means is conveniently dissipated through the motor housing to the surrounding water, providing a good heat transfer relationship. The resistance means may be positioned in the trolling motor housing or in the conduit which is immersed in the water to conduct the electrical lines to the motor housing from the boat. Moreover, because of the good heat transfer relationship provided by the trolling motor housing of the present invention, less expensive material can be used to provide the resistance means and the resistance means can be made small in size while providing the advantages of a variable speed trolling motor.

While the present invention has been described with particular reference to specific embodiments thereof, it will be understood that it may be embodied in a large variety of forms diverse from the ones specifically shown and described without departing from the scope and spirit of the invention as defined by the appended claims.

I claim:

1. A trolling motor adapted for operation immersed in water comprising:
   a watertight motor housing including a hollow housing portion with an open end and an end cap adapted to close and seal the open end of the hollow housing portion;
   flux generating means supported by the motor housing;
   an armature assembly having a shaft rotatably supported by the motor housing; and
   electrical means including a coil of wire providing an electrical resistance supported in the end cap and wound in a tubular form to conform to the shape of a portion of the walls of the end cap, the coil of wire being adjacent and fixed to the portion of the walls of the end cap in good heat transfer relationship therewith, the electrical means further including circuit means for connecting a source of voltage to the armature assembly alternatively directly to the armature or to the armature through the coil of wire, whereby when the coil of wire is connected with the circuit means, heat generated by the coil of wire is dissipated through the motor housing to the water.

2. The trolling motor of claim 1 in which the walls of the end cap form a cylindrical recess, and the coil of wire is positioned in the recess and is cylindrical in form to conform to the shape of the walls of the end cap.

3. The trolling motor of claim 1 in which the coil of wire conforms to the shape of at least two opposed portions of the walls of the end cap and is fixed to the portions of the walls.

4. The trolling motor of claim 1 in which the walls of the end cap form a recess in the end cap, and the coil of wire is positioned in the recess.

5. The trolling motor of claim 1 in which the coil of wire has a connection terminal between its ends, the circuit means connecting the source of voltage alternatively directly to the armature, to the armature through the coil of wire or to the armature through a portion of the coil of wire from the connection terminal, whereby three speeds of motor operation are provided.

6. The trolling motor of claim 1 in which the coil of wire provides a wire wound resistor supported in and conforming to the shape of the walls of the end cap, and the electrical means further including commutator means supported by the armature and at least two brushes supported by the end cap and arranged to contact the commutator means.